United States Patent
Griffin, Jr. et al.

(10) Patent No.: US 9,086,702 B2
(45) Date of Patent: Jul. 21, 2015

(54) PRESSURE-BALANCED FLUID PRESSURE REGULATORS

(75) Inventors: James Lyman Griffin, Jr., McKinney, TX (US); Daniel Gunder Roper, Lucas, TX (US); Jason Dirk Jablonski, Marshalltown, IA (US); Harold Joe McKinney, Durant, OK (US); Andrew Jared Lukensmeyer, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 638 days.

(21) Appl. No.: 13/175,267

(22) Filed: Jul. 1, 2011

(65) Prior Publication Data
US 2013/0000756 A1   Jan. 3, 2013

(51) Int. Cl.
| | | |
|---|---|---|
| *G05D 16/18* | (2006.01) | |
| *F16K 31/126* | (2006.01) | |
| *F16K 1/46* | (2006.01) | |
| *F16K 31/128* | (2006.01) | |

(52) U.S. Cl.
CPC ................ *G05D 16/185* (2013.01); *F16K 1/46* (2013.01); *F16K 31/1266* (2013.01); *F16K 31/128* (2013.01); *F16K 31/1262* (2013.01); *Y10T 137/7904* (2015.04)

(58) Field of Classification Search
CPC . F16K 31/365; F16K 31/128; F16K 31/1262; F16K 31/1266; F16K 1/46; G05D 16/185
USPC ................... 251/33, 46, 61.2, 61.4, 282, 365; 137/315.05, 315.41, 487, 491, 492, 137/492.5, 495, 505.14
See application file for complete search history.

(56) References Cited

U.S. PATENT DOCUMENTS

| | | | | |
|---|---|---|---|---|
| 1,279,898 | A | * | 9/1918 | Nixon ......................... 137/68.19 |
| 1,935,548 | A | | 11/1933 | Eggleston et al. |
| 2,519,541 | A | | 8/1950 | Bryant |

(Continued)

FOREIGN PATENT DOCUMENTS

| | | |
|---|---|---|
| GB | 763134 A | 12/1956 |
| WO | 9808150 A1 | 2/1998 |
| WO | 2009015095 A1 | 1/2009 |

OTHER PUBLICATIONS

Patent Cooperation Treaty, International Search Report, issued in connection with Application No. PCT/US2012/044825, mailed on Feb. 7, 2013, 7 pages.

(Continued)

*Primary Examiner* — Matthew W Jellett
(74) *Attorney, Agent, or Firm* — Hanley, Flight & Zimmerman, LLC (57) ABSTRACT

Pressure-balanced fluid pressure regulators are described. An example fluid regulator includes a fluid flow control member disposed within a fluid flow passageway of a valve body and moves relative to a seat ring to modulate fluid flow through the fluid flow passageway. A valve stem couples the fluid flow control member to an actuator. The valve stem has a pathway to allow fluid from an inlet of the fluid flow passageway to flow across the flow control member between a first side of the flow control member and a second side of the flow control member opposite the first side to pressure-balance the fluid flow control member.

26 Claims, 5 Drawing Sheets

(56) References Cited

U.S. PATENT DOCUMENTS

| | | | | |
|---|---|---|---|---|
| 2,916,255 | A | * | 12/1959 | Koehler .................. 251/331 |
| 3,025,881 | A | * | 3/1962 | Freeman ................ 137/627.5 |
| 3,103,949 | A | * | 9/1963 | Fiorentini .................. 137/492 |
| 3,112,094 | A | * | 11/1963 | Nees et al. .............. 251/30.02 |
| 3,459,403 | A | * | 8/1969 | Royer ........................ 251/34 |
| 3,550,623 | A | | 12/1970 | Katchka |
| 3,575,203 | A | | 4/1971 | Johnson |
| 3,967,782 | A | * | 7/1976 | Eschbaugh et al. ......... 236/92 B |
| 4,987,920 | A | * | 1/1991 | Donner ..................... 137/242 |
| 5,123,442 | A | * | 6/1992 | Geuy et al. ................. 137/495 |
| 5,131,627 | A | * | 7/1992 | Kolenc ...................... 251/331 |
| 6,354,319 | B1 | * | 3/2002 | Mooney ....................... 137/14 |
| 7,748,401 | B2 | * | 7/2010 | Zecchi et al. ............ 137/315.05 |
| 7,896,028 | B2 | * | 3/2011 | Weyer et al. ............. 137/625.33 |
| 8,322,359 | B2 | * | 12/2012 | Zecchi et al. .............. 137/15.18 |
| 8,590,858 | B2 | * | 11/2013 | Roper et al. ................ 251/61.3 |
| 2002/0007854 | A1 | | 1/2002 | Dilger et al. |
| 2008/0078460 | A1 | * | 4/2008 | Roper et al. .................. 137/540 |
| 2009/0065073 | A1 | * | 3/2009 | Davis .......................... 137/505 |

OTHER PUBLICATIONS

Patent Cooperation Treaty, Written Opinion of the International Search Authority, issued in connection with Application No. PCT/US2012/044825, mailed on Feb. 7, 2013, 12 pages.

Patent Cooperation Treaty, Communication Relating to the Results of the Partial International Search, issued in connection with Application No. PCT/US2012/044825, mailed on Feb. 7, 2013, 2 pages.

Fisher, "Type EZL Pressure Reducing Regulator for Low Pressure Applications," Instruction Manual, published Dec. 2008, 24 pages.

Fisher, "EZH and EZHSO Series," Instruction Manual, published Apr. 2011, 40 pages.

Pietro Fiorentini, "Relux 819," Product Catalog, published Nov. 2010, 12 pages.

Fisher, "Type EZH—New Sizes," published Mar. 2008, 2 pages.

* cited by examiner

PRESSURE-BALANCED FLUID PRESSURE REGULATORS

FIELD OF THE DISCLOSURE

The present disclosure relates generally to fluid regulators and more particularly, pressure-balanced fluid pressure regulators.

BACKGROUND

Fluid valves and regulators are commonly distributed throughout process control systems to control the flow rates and/or pressures of various fluids (e.g., liquids, gasses, etc.). In particular, a fluid regulator is typically used to reduce the pressure of a fluid and regulate the pressure to a substantially constant value. Specifically, a fluid regulator has an inlet that typically receives a supply fluid at a relatively high pressure and provides a relatively lower pressure at an outlet. Inlet pressure is reduced to a lower outlet pressure by restricting flow through an orifice to match the fluctuating downstream demand. For example, a gas regulator associated with a piece of equipment (e.g., a boiler) may receive a gas having a relatively high and somewhat variable pressure from a gas distribution source and may regulate the gas to have a lower, substantially constant pressure suitable for safe, efficient use by the equipment.

SUMMARY

In one example, a fluid pressure regulator includes a fluid flow control member disposed within a fluid flow passageway of a valve body and moves relative to a seat ring to modulate fluid flow through the fluid flow passageway. A valve stem couples the fluid flow control member to an actuator. The valve stem has a pathway to allow fluid from an inlet of the fluid flow passageway to flow across the flow control member between a first side of the flow control member and a second side of the flow control member opposite the first side to pressure-balance the fluid flow control member.

In another example, a pressure regulator includes a flow control member disposed within a fluid flow passageway defined by a valve body. The flow control member has a metallic sealing surface that is to move relative to an elastomeric seating surface of a seat ring disposed within the fluid flow passageway. The metallic sealing surface is coupled to a disk holder via a disk retainer. A valve stem operatively couples the flow control member to a diaphragm of an actuator. The flow control member is threadably coupled to a first end of the valve stem via the retainer and a second end of the valve stem opposite the first end is directly coupled to the diaphragm of the actuator via a diaphragm plate.

DETAILED DESCRIPTION

In contrast to known fluid regulators, which often employ a tube to couple a flow control member to an actuator, the example fluid regulators described herein employ a valve stem to couple a flow control member to an actuator. In some examples, the valve stem may include a passageway to pressure-balance the flow control member, thus requiring less force to open and/or close the flow control member. As a result, a smaller actuator may be provided, thereby reducing costs. Additionally, in contrast to conventional seat rings, the example fluid regulators described herein employ a valve seat or seat ring that provides a seating surface composed of an elastomeric material (e.g., an elastomeric seal, disk or ring). As a result, wear to the elastomeric seal due to, for example, flow impingement or particulate in a process fluid is significantly reduced or prevented.

In some examples, a screen or strainer may be coupled to the seat ring to filter or prevent impurities (e.g., large particulate) within a process fluid from flowing downstream of an outlet of the fluid regulator. In particular, the strainer may be composed of a plurality of non-continuous curved surfaces. As a result, the strainer may be less susceptible to ice formation when used with process fluids having relatively low temperatures.

Further, unlike conventional fluid regulators, an actuator casing of an example fluid regulator described herein has an inner surface having a curved or smooth profile or shape. In this manner, a diaphragm of an actuator can contact the inner surface of the actuator casing with an increased contact surface area, which reduces stress concentration on the diaphragm at the areas of contact. Additionally or alternatively, a diaphragm plate that couples the stem to the flow control member may be smaller in size to allow the diaphragm to flex or bend more freely compared to a conventional fluid regulator. Allowing the diaphragm to freely flex or bend significantly reduces localized stresses on the diaphragm. Such reduced localized stress concentrations significantly increases the cycle life or fatigue life of the diaphragm, thereby reducing maintenance and costs.

Figure 1A:
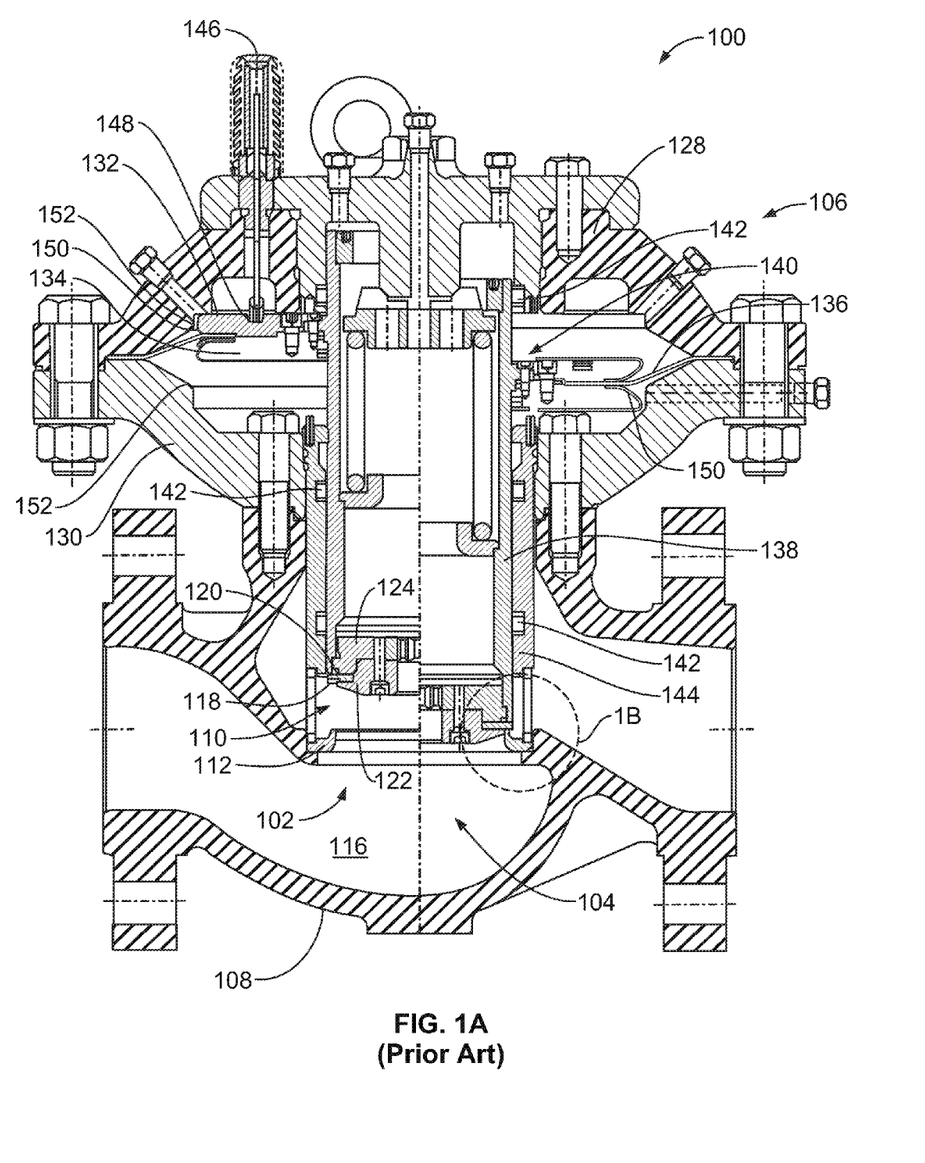
FIG. 1A is a split, cross-sectional view of a known fluid regulator.
Figure 1B:
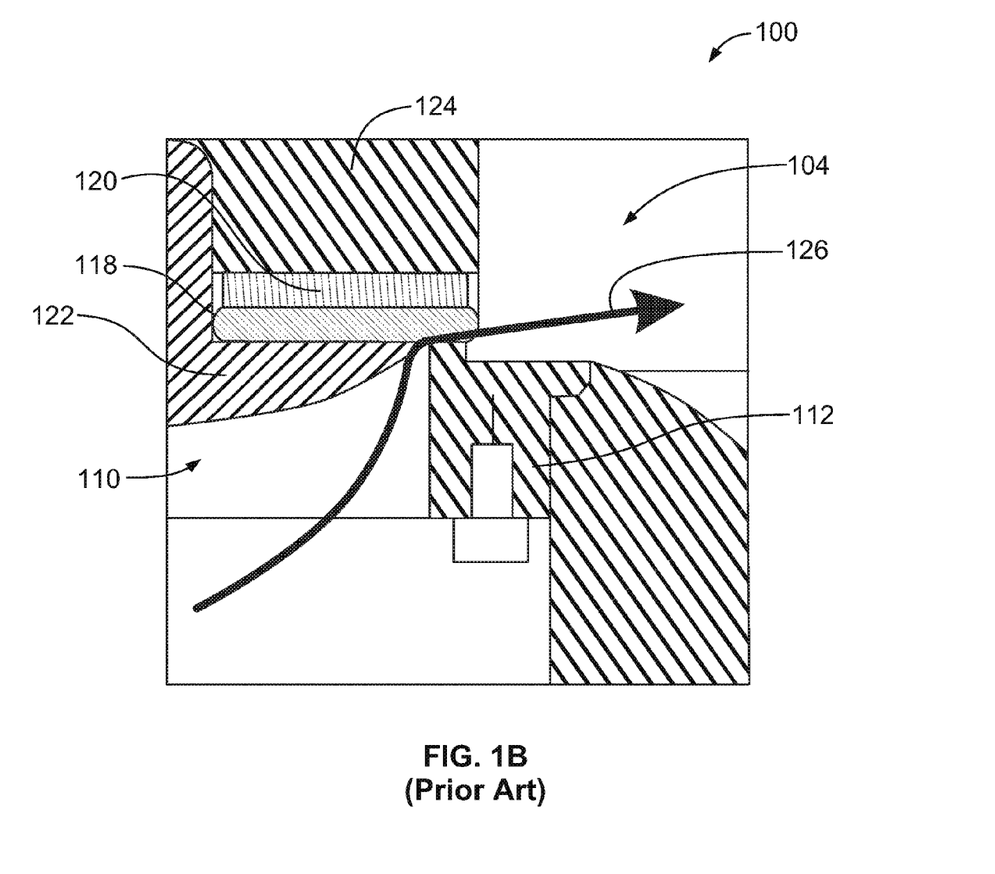
FIG. 1B is an enlarged cross-sectional view of a portion of the known fluid regulator of FIG. 1A.

A brief description of a known fluid regulator 100 is provided below in connection with FIGS. 1A and 1B. FIG. 1A is a split, cross-sectional view of the known fluid regulator 100 showing the fluid regulator 100 in an open position 102 on the left hand side of the figure and a closed position 104 on the right hand side of the figure. FIG. 1B is an enlarged, partial cross-sectional view of the conventional fluid regulator 100 of FIG. 1A.

Referring to FIGS. 1A and 1B, the known fluid regulator 100 includes an actuator 106 coupled to a valve body 108. The actuator 106 moves a flow control member or throttling member 110 relative to a seat ring 112 to control fluid flow through a passageway 116 of the valve body 108.

The flow control member 110 of the fluid regulator 100 is depicted as a disk-type valve. The flow control member 110 includes a sealing disk 118, a disk mount or holder 120, a disk retainer 122 and a stem adaptor 124. The sealing disk 118 is a substantially disk-shaped ring and is composed of an elastomeric material. However, the elastomeric sealing disk 118 can be prone to wear and can experience rapid erosion and damage when used in severe service conditions (e.g., fluids having a relatively high velocity and/or a relatively high temperature). For example, as shown in FIG. 1B, relatively large forces may be imparted on the sealing disk 118 due to flow impingement caused by a relatively high velocity fluid flow 126, thereby causing the sealing disk 118 to wear. The resulting wear on the elastomeric sealing disk 118 can prevent the flow control member 110 from properly sealing against the seat ring 112 and may necessitate the shut down or bypass of a process system to replace the sealing disk 118. As a result, the flow control member 110 requires increased maintenance.

In the illustrated example, the actuator 106 includes an upper casing 128 and a lower casing 130 that contain diaphragm plates 132 and 134. The diaphragm plates 132 and 134 hold a diaphragm 136 in operative engagement with a tube 138. Thus, the diaphragm plates 132 and 134 couple the tube 138 and the flow control member 110 to the diaphragm 136 via a tube connection 140. However, having the tube connection 140 as shown in FIG. 1A significantly increases manufacturing costs and complexity. For example, the tube connection 140 requires a plurality of seals 142 to seal between the tube 138 and the valve body 108 and/or a cage 144.

Further, due to the tube connection 140, a travel indicator 146 is coupled to the diaphragm plate 132 to provide an indication of the position of the flow control member 110 relative to the seat ring 112. The travel indicator 146 is coupled to an aperture 148 of the diaphragm plate 132 via a snap-fit connection. Such a snap-fit connection is not as strong as, for example, a threaded connection and may be susceptible to being pulled away from the diaphragm plate 132 (e.g., being pulled-out from the diaphragm plate 132) during operation, thereby requiring increased maintenance and shut-down to reconnect the travel indicator 146 to the diaphragm plate 132.

Additionally or alternatively, the diaphragm plates 132 and 134 transfer a load from the diaphragm 136 to move the tube 138 between the open and closed positions 102 and 104 and, thus, are sized to support relatively large transfer loads. In operation, a pressure differential across the diaphragm 136 causes the diaphragm 136 to bend or flex, causing the flow control member 110 to move relative to the seat ring 112 via the tube 138 to control fluid flow through the passageway 116. However, the diaphragm plates 132 and 134 and/or the actuator casings 128 and 130 form pinch point 150 or have sharp angles or non-smooth contact surfaces 152. As a result, the diaphragm 136 is constrained to flex or bend about a relatively small surface area. Additionally or alternatively, the diaphragm 136 engages the sharp angled portions 150 and 152 of the diaphragm plates 132 and 134 and/or the actuator 106 with a relatively small contact area, thereby increasing stress concentration on the diaphragm 136 at the areas of contact. Such localized stress concentrations imparted to the diaphragm 136 can significantly reduce the cycle life or fatigue life of the diaphragm 136, thereby causing increased maintenance and costs.

Figure 2:
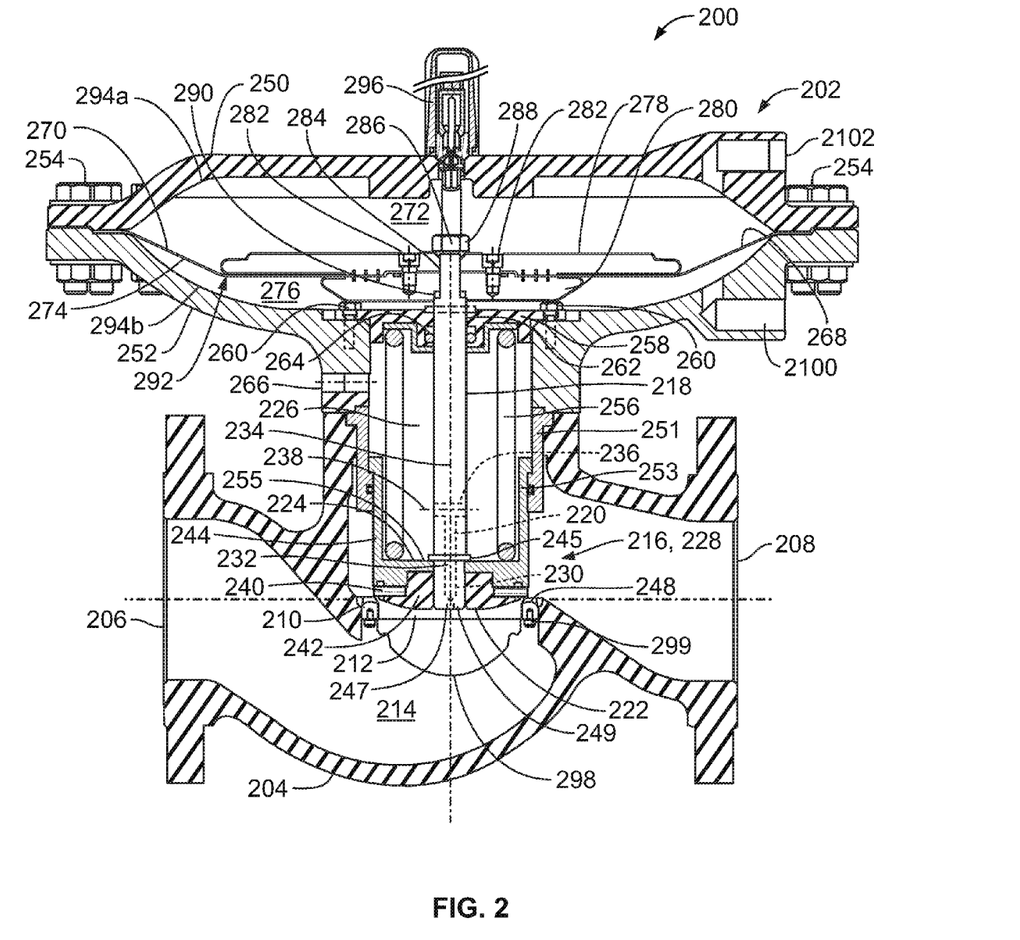
FIG. 2 is a cross-sectional view of an example pressure-balanced fluid pressure regulator described herein.
Figure 3:
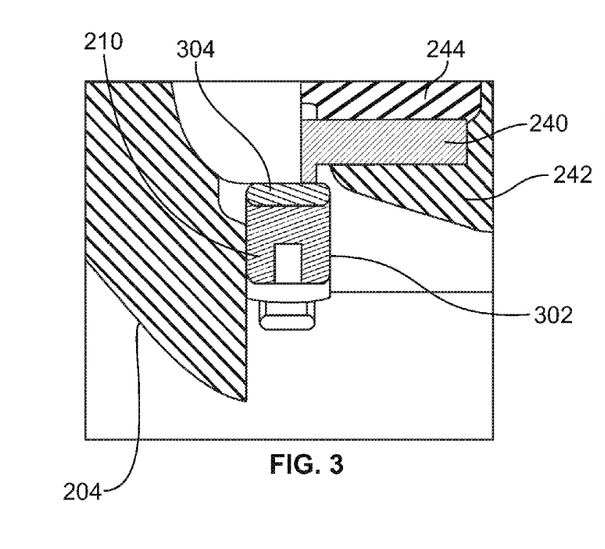
FIG. 3 is another cross-sectional view of a portion of the example fluid regulator of FIG. 2.
Figure 4:
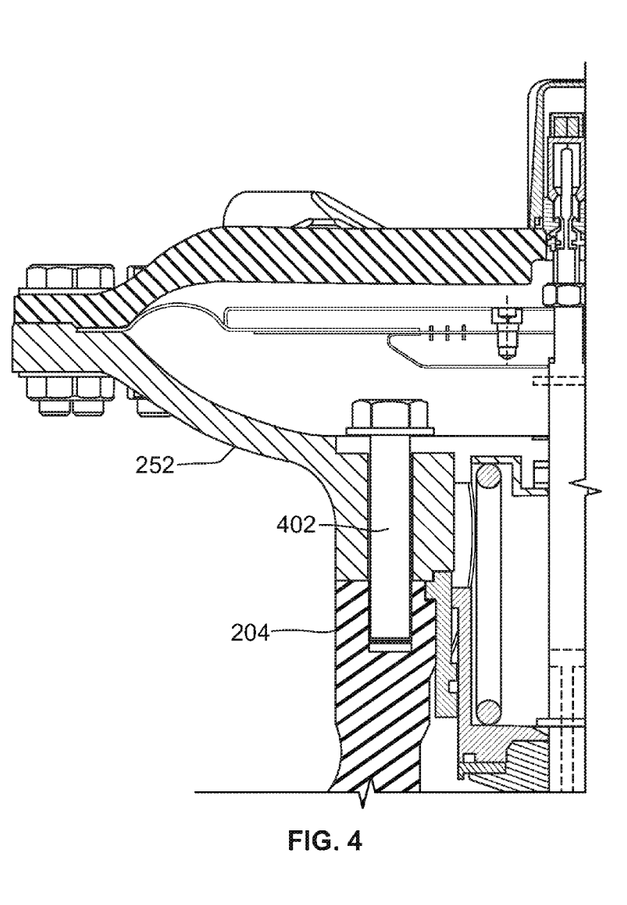
FIG. 4 is an enlarged, partial cross-sectional view of the example fluid regulator of FIG. 2.

FIG. 2 illustrates an example fluid regulator 200 described herein. FIG. 3 is a partial, enlarged view of the example fluid regulator 200 of FIG. 2. FIG. 4 is another partial, cross-sectional view of the example fluid regulator 200 of FIG. 2.

Referring to FIG. 2, the example fluid regulator 200 includes an actuator 202 coupled to a valve body 204. The valve body 204 has an inlet 206 for connection to an upstream pipeline at which relatively high pressure process fluid is presented. The valve body 204 also has an outlet 208 for connection to a downstream pipeline to which the fluid regulator 200 provides the process fluid at a lower regulated pressure. The valve body 204 is the main pressure boundary of the fluid regulator 200 and supports a seating surface or seat ring 210 that is mounted in the valve body 204 and which defines an orifice 212 of a fluid flow passageway 214 defined by the valve body 204 between the inlet 206 and the outlet 208. The actuator 202 moves a throttling member or flow control member 216 relative to the seat ring 210 to control or modulate fluid flow through the passageway 214.

Unlike the known fluid regulator 100 of FIG. 1A, the example fluid regulator 200 employs a valve stem 218 to operatively couple the flow control member 216 to the actuator 202. Additionally, the valve stem 218 of the illustrated example includes a pathway 220 to fluidly couple a first side 222 of the flow control member 216 in fluid communication with the inlet 206 and a second side 224 of the flow control member 216 in fluid communication with a spring chamber 226 to provide a pressure-balanced trim apparatus or assembly 228. As shown, the pathway 220 of the valve stem 218 includes a first path 230 (e.g., a first bore) along a portion of the valve stem 218 adjacent the flow control member 216 that has an axis 232 substantially parallel to, and/or aligned with, a longitudinal axis 234 of the valve stem 218 and a second path 236 (e.g., a second bore or aperture) having an axis 238 that intersects (e.g., is substantially perpendicular to) the longitudinal axis 234 of the valve stem 218 to fluidly couple the first path 230 to the spring chamber 226. As a result, the pathway 220 allows fluid to flow from the inlet 206, across the flow control member 216 and to the spring chamber 226 such that the pathway 220 through the valve stem 218 provides a pressure-balanced trim or flow control member 216 to accommodate high pressure applications. Additionally or alternatively, a relatively smaller actuator (e.g., in size, weight, force, etc.) may be employed because a pressure-balanced flow control member typically requires less force to move between an open position and a closed position (e.g., the position shown in FIG. 2).

The flow control member 216 of the fluid regulator 200 is depicted as a disk-type valve. As shown, the flow control member 216 includes a sealing disk 240, a disk retainer 242 and a disk holder 244. The sealing disk 240 is a substantially disk-shaped ring and is composed of, for example, a metallic material. The disk retainer 242 includes an aperture (e.g., a threaded aperture) to threadably couple to an outer surface (e.g., a threaded portion) of the valve stem 218 adjacent the pathway 220. The disk holder 244 is captured between the disk retainer 242 and a shoulder or flange 245 (e.g., a pin) along an outer surface of the valve stem 218. The sealing disk 240 is captured between the disk retainer 242 and the disk holder 244 such that an opening 247 of the pathway 220 is adjacent the first side 222 of the flow control member 216. An end 249 of the valve stem 218 may be substantially flush relative to a surface of the disk retainer 242 in communication with the inlet 206. A guide 251 guides the disk holder 244 and the flow control member 216 as the flow control member 216 moves between an open position and a closed position. As described in greater detail below, the disk holder 244 includes a wall 253 that defines a spring seat 255.

Further, the seat ring 210 of the fluid regulator 200 includes a seating surface or ring 248 composed of an elastomeric material. As most clearly shown in FIG. 3, the seat ring 210 is a two-piece structure that includes a first portion 302 composed of a metallic material (e.g., steel) and a second portion 304 composed of an elastomeric material. The elastomeric material or ring 304 may be coupled to the seat ring 210 via chemical bonding, a fastener or any other suitable fastening mechanism(s). In some examples, the first portion 302 may include a groove or channel to receive the elastomeric ring 304. In this manner, particulate in a process fluid and/or relatively high forces due to flow impingement are imparted to the sealing disk 240 of the flow control member 216 and/or the metallic portion 302 of the seat ring 210 rather than the elastomeric ring 304, thereby increasing the operational life of the elastomeric ring 304. Further, the resilient, elastomeric ring 304 provides a relatively tight seal and/or may shift or move (e.g., self-align) when the sealing disk 240 sealingly engages the elastomeric ring 304 to minimize perpendicularity issues caused, for example, by misalignment due to imprecise manufacturing and/or installation of the components. The sealing disk 240 and/or the metallic portion 302 of the seat ring 210 can be composed of a metal such as steel and the elastomeric ring 304 can be composed of an elastomeric material such as fluoroelastomer (FKM), Neoprene, Nitrile, etc.

The actuator 202 of the illustrated example includes an upper casing 250 coupled to a lower casing 252 via fasteners 254. Referring also to FIG. 4, the lower casing 252 of the actuator 202 is coupled to the valve body 204 via a fastener 402. As shown in FIG. 2, the lower casing 252 and the valve body 204 define the spring chamber 226 when the actuator 202 is coupled to the valve body 204. To bias the flow control member 216 toward the seat ring 210, a biasing element 256 (e.g., a spring) is captured between the spring seat 255 of the flow control member 216 and a spring seat 258. The spring seat 258 is coupled to the lower casing 252 of the actuator 202 via fasteners 260 and includes an aperture 262 to slidably receive the valve stem 218. A seal 264 is disposed within the aperture 262 to prevent fluid leakage between the spring chamber 226 and the actuator 202. Further, the lower casing 252 includes a pilot supply port 266 that fluidly couples the spring chamber 226 or the inlet 206 to a pilot supply (not shown) via the pathway 220 of the valve stem 218.

A sensing element or diaphragm 268 is disposed or captured between the upper and lower casings 250 and 252 such that a first surface or side 270 of the diaphragm 268 and the upper casing 250 define a first chamber 272 and a second surface or side 274 of the diaphragm 268 and the lower casing 252 define a second or loading chamber 276. As noted above, in contrast to the known fluid regulator 100 of FIG. 1A, which employs the tube 138 to couple the diaphragm 136 to the flow control member 110, the example fluid regulator 200 employs the valve stem 218 to operatively couple the flow control member 216 to the diaphragm 268, which significantly reduces manufacturing costs and complexity compared to the fluid regulator 100.

The upper and lower casings 250 and 252 also contain diaphragm plates 278 and 280, which are coupled to the diaphragm 268 to provide support to the diaphragm 268 and operatively couple the diaphragm 268 to the valve stem 218. The diaphragm plates 278 and 280 are coupled together to capture the diaphragm 268 via fasteners 282. Also, the diaphragm plates 278 and 280 have respective apertures to form an opening 284 to receive an end 286 of the valve stem 218 opposite the pathway 220. In particular, the end 286 of the valve stem 218 includes a reduced diameter portion that is disposed within the opening 284. To couple the valve stem 218 to the diaphragm 268, a fastener 288 (e.g., a nut) is coupled to the end 286 of the valve stem 218 to engage the diaphragm plate 278 and a shoulder 290 of the valve stem 218 formed by the reduced diameter portion engages the diaphragm plate 280.

As shown, because the valve stem 218 has a relatively smaller diameter or cross-section than, for example, the tube 138 of FIG. 1A, the diaphragm plate 280 can have a significantly smaller dimensional footprint relative to the diaphragm plate 278. However, in other examples, a diameter of the diaphragm plate 278 may be smaller than a diameter of the diaphragm plate 280. As a result, unlike the diaphragm plates 132 and 134 of the fluid regulator 100 of FIG. 1A, the diaphragm plates 278 and 280 enable the diaphragm 268 to flex or bend more freely relative to the diaphragm plate 280. In particular, the diaphragm plates 278 and 280 provide a non-pinch area 292 about which the diaphragm 268 can bend or flex during operation. Allowing the diaphragm 268 to flex or bend more freely significantly reduces localized stresses on the diaphragm 268.

Additionally or alternatively, each of the inner surfaces 294a and 294b of the respective upper and lower casings 250 and 252 has a substantially smooth or curved profile or shape (e.g., a non-sharp angle or profile). As a result, the smooth, curved profile or shape provides an increased contact surface area to reduce localized stress concentrations on the diaphragm 268 at the areas of contact between the diaphragm 268 and the inner surfaces 294a and 294b of the respective casings 250 and 252. Such reduced localized stress concentrations significantly increases the cycle life or fatigue life of the diaphragm 268, thereby reducing maintenance and costs.

Additionally, unlike the tube 138 of the fluid regulator 100 of FIG. 1A, the valve stem 218 provides a mounting surface to enable a travel indicator 296 to be coupled to the valve stem 218 via threads. As a result, the travel indicator 296 is less susceptible to being disconnected from (e.g., pulled-out relative to) the valve stem 218 during operation compared to, for example, the travel indicator 146 of FIG. 1A, which is coupled to the diaphragm plate 132 via a snap-fit connection because the tube 138 lacks a mounting surface.

Figure 5:
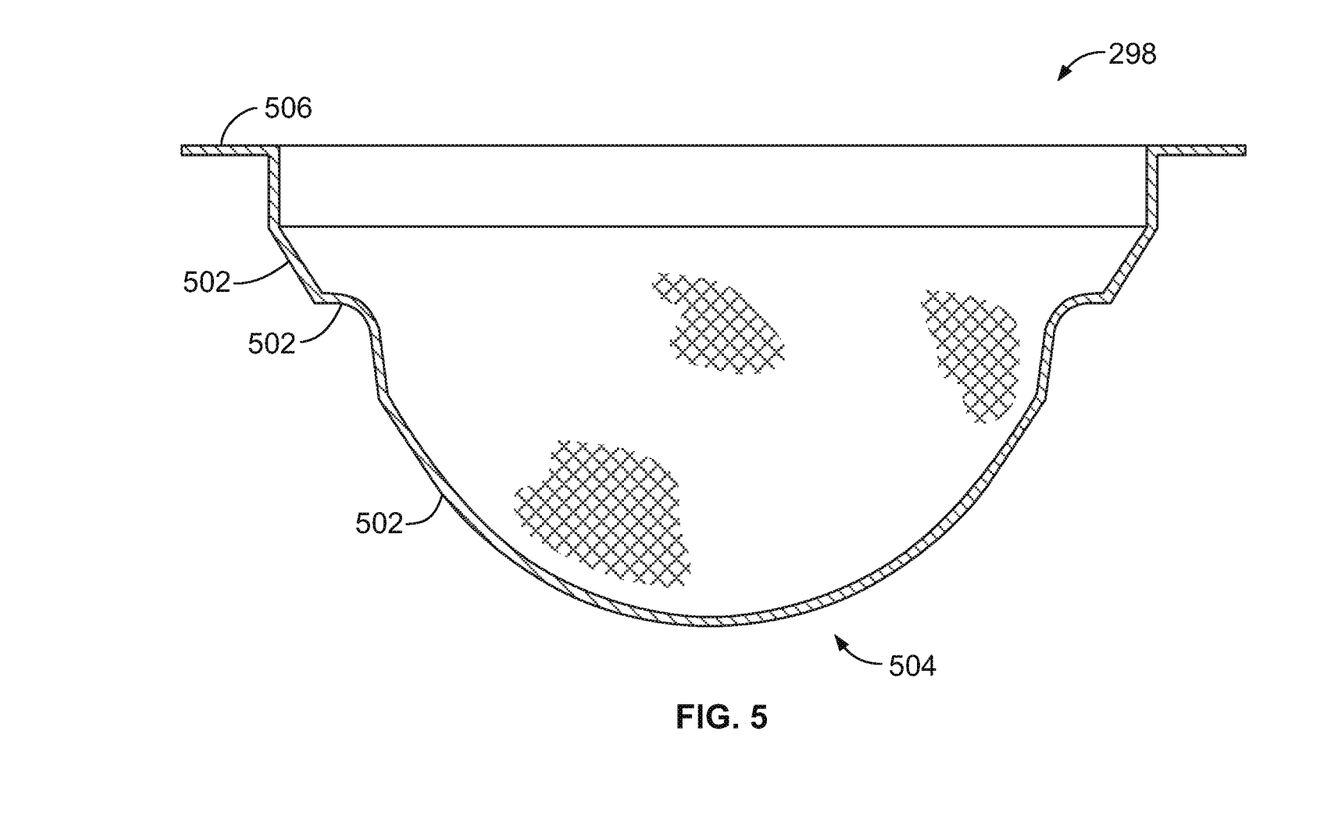
FIG. 5 is a cross-sectional view of an example strainer of the fluid regulator of FIG. 2.

The fluid regulator 200 of the illustrated may also include a screen or strainer 298 to capture, filter or remove impurities (e.g., particulate) within a process fluid flowing between the inlet 206 and the outlet 208. In the illustrated example, the strainer 298 is coupled to the seat ring 210 via fasteners 299. In particular, as most clearly shown in FIG. 5, the strainer 298 is composed of a mesh material and has a plurality of non-continuous arcuate or curved surfaces 502 such that a profile or cross-sectional shape of the screen provides a non-continuous or non-smooth curved profile 504. As a result, the strainer 298 is less susceptible to ice formation compared to a screen having a continuously smooth curved surface when used with process fluids having relatively low temperatures. The strainer 298 also includes a flange 506 to enable coupling the strainer 298 to the seat ring 210.

In operation, referring to FIG. 2, movements of the flow control member 216 are caused by pressure differentials across the diaphragm 268, where the pressure differentials are proportional to a difference between an actual pressure at the outlet 208 and a desired pressure at the outlet 208. In particular, the flow control member 216 moves away from the seat ring 210 to allow fluid flow through the passageway 214 and moves toward the seat ring 210 to prevent or restrict fluid flow through the passageway 214. In the illustrated example, the biasing element 256 helps to bias the flow control member 216 to a closed position.

An access port 2100 of the lower casing 252 provides an inlet to fluidly couple a load pressure or control pressure (e.g., via a pilot operator) to the loading chamber 276 via a loading pressure control line (not shown). A downstream access port 2102 fluidly couples the downstream pressure (i.e., outlet pressure) to the first chamber 272 via a downstream control line (not shown). The flow control member 216 moves to an open position (i.e., away from the seat ring 210) to allow fluid flow through the passageway 214 when the loading pressure overcomes the spring force provided by the biasing element 256 and downstream pressure applied to the first side 270 of the diaphragm 268 via the first chamber 272.

The loading pressure in the loading chamber 276 can be supplied by a monitoring device that monitors or senses changes in the output or downstream pressure (i.e., a controlled pressure) such as, for example, a pilot regulator or amplifier. However, other example implementations may use other types of regulators such as for example, a self-operated regulator, a pressure loaded regulator, etc.

In pilot operation, the loading pressure (i.e., the pressure supplied by a monitoring device such as, for example, a pilot operator or amplifier) acts as an operating medium that applies a load to the second side 274 of the diaphragm 268. The loading pressure is provided to the loading chamber 276 through the access port 2100 via a loading pressure control line (not shown). A pilot supply pressure is provided to the monitoring device (not shown) via the pilot supply port 266 of the actuator 202. Thus, a pilot supply pressure is provided by the pressure at the inlet 206, which is fluidly coupled to the monitoring device via the pilot supply port 266 of the actuator 202 and the pathway 220 of the valve stem 218. A drop in pressure in the outlet 208 or downstream pressure below a desired pressure setting of the monitoring device causes the loading pressure (i.e., supplied by the pilot operator) to increase, and the increased load on the diaphragm 268 through the loading chamber 276 causes the diaphragm 268 to displace such that the valve stem 218 and, thus, the flow control member 216 move away from the seat ring 210 to allow fluid flow from the inlet 206 to the outlet 208 and to a downstream system (not shown).

The outlet 208 or downstream pressure opposes the loading pressure and acts on the diaphragm 268 from the first chamber 272 through the downstream access port 2102 via a downstream control line (not shown). As the outlet 208 or downstream pressure increases, the outlet 208 or downstream pressure is transmitted to the first chamber 272 via the downstream access port 2102 and acts with the biasing element 256 to cause the diaphragm 268 to displace such that the valve stem 218 and, thus, the flow control member 216 move toward the seat ring 210 to restrict fluid flow through the regulator 200.

Although certain apparatus and articles of manufacture have been described herein, the scope of coverage of this patent is not limited thereto. To the contrary, this patent covers all apparatus and articles of manufacture fairly falling within the scope of the appended claims either literally or under the doctrine of equivalents.

What is claimed is:

1. A fluid regulator comprising:
    a valve body defining a fluid flow passageway between an inlet and an outlet;
    an actuator to be coupled to the valve body, the actuator having a first chamber and a second chamber, the valve body or the actuator defining a third chamber to be fluidly separated from the first and second chambers of the actuators;
    a fluid flow control member to be disposed within the fluid flow passageway, the flow control member to move relative to a seat ring to modulate fluid flow through the fluid flow passageway between the inlet and the outlet, the flow control member having a first side to engage the seat ring and a second side opposite the first side;
    a valve stem to couple the fluid flow control member to the actuator, the valve stem having a pathway to fluidly couple the inlet of the fluid flow passageway and the third chamber to enable fluid from the inlet to flow across the fluid flow control member between the first side of the fluid flow control member and the third chamber in direct fluid communication with the second side of the flow control member to pressure-balance the fluid flow control member when the flow control member is in engagement with the seat ring;
    a port in fluid communication with the third chamber, the port to fluidly couple the inlet and a fluid source via the pathway of the valve stem and the third chamber; and
    a guide positioned in the third chamber and slidably coupled to the flow control member, the guide having a first end and a second end, the first end of the guide having a first flanged portion captured between the valve body and the actuator, the second end having a second flanged portion to engage a flange of the flow control member, the flow control member to slide relative to the guide when the flow control member moves between an open position and a closed position relative to the seat ring.

2. A fluid regulator as defined in claim 1, wherein the pathway comprises a first path and a second path.

3. A fluid regulator as defined in claim 2, wherein the first path comprises a first bore in the valve stem having an axis substantially parallel to a longitudinal axis of the valve stem and the second path comprises a second bore having an axis that intersects the longitudinal axis of the valve stem.

4. A fluid regulator as defined in claim 1, further comprising the seat ring and wherein the flow control member is to move relative to the seat ring and wherein the seat ring defines an orifice of the fluid flow passageway.

5. A fluid regulator as defined in claim 4, wherein at least a portion of the seat ring includes an elastomeric ring.

6. A fluid regulator as defined in claim 5, wherein the seat ring comprises a first portion composed of a metallic material and a second portion composed of an elastomeric material, wherein the second portion defines a seating surface of the seat ring having a face that is orthogonal relative to a longitudinal axis defined by the first portion of the seat ring.

7. A fluid regulator as defined in claim 1, wherein the flow control member comprises a sealing disk composed of a metallic material that is coupled to a disk holder via a disk retainer.

8. A fluid regulator as defined in claim 7, wherein the disk retainer threadably engages an end of the valve stem adjacent an opening of the pathway to couple the flow control member to the valve stem.

9. A fluid regulator as defined in claim 1, wherein an end of the valve stem opposite the pathway is to be directly coupled to the actuator.

10. A fluid regulator as defined in claim 9, wherein the actuator comprises a diaphragm coupled to the valve stem via first and second diaphragm plates.

11. A fluid regulator as defined in claim 10, wherein the first diaphragm plate has a diameter that is larger than a diameter of the second diaphragm plate.

12. A fluid regulator as defined in claim 1, further comprising a strainer to be coupled to the seat ring, the strainer being composed of a plurality of arcuate surfaces, wherein a first arcuate surface has a first radius of curvature that is different than a second radius of curvature of a second arcuate surface of the plurality of surfaces such that the first and second arcuate surfaces form a curve having a non-uniform curved profile or shape.

13. A fluid regulator as defined in claim 1, further comprising a travel indicator threadably coupled to the valve stem.

14. A fluid regulator as defined in claim 13, wherein the travel indicator is threadably coupled to an end of the valve stem adjacent a diaphragm plate.

15. The fluid regulator of claim 1, wherein the valve stem has a solid body and the pathway extends only partially along a length of the valve stem.

16. The fluid regulator of claim 1, wherein the actuator and the valve body define the third chamber when the actuator is coupled to the valve body.

17. The fluid regulator of claim 1, further comprising a biasing element positioned in the third chamber to bias the flow control member toward the seat ring.

18. The fluid regulator of claim 1, wherein a first side of the flow control member is to engage the seat ring and a second side of the flow control member opposite the first side to be in communication with the third chamber.

19. The fluid regulator of claim 1, wherein the guide has an inner surface defining at least a portion of the third chamber.

20. A fluid regulator, comprising:
an actuator having a sensing element to define a first chamber and a second chamber;
a valve body defining a fluid flow passageway between an inlet and an outlet, the valve body and the actuator defining a third chamber when the actuator is coupled to the valve body, the third chamber being fluidly isolated from the first and second chambers;
a flow control member disposed within the fluid flow passageway defined by a valve body, the flow control member having a sealing disk coupled to a disk holder via a disk retainer, the disk holder having a first end and a second end, the disk retainer to couple the sealing disk to the first end of the disk holder;
a valve stem to operatively couple the flow control member to the sensing element of the actuator, the valve stem having a first end coupled to the sensing element and a second end coupled to the disk retainer, the disk holder, the sealing disk and the disk retainer to move with the valve stem when the sensing element moves between a first position and a second position; and
a guide positioned in the third chamber and slidably coupled to the disk holder, the guide having a first end and a second end, the first end of the guide having a first flanged portion captured between the valve body and the actuator, the second end having a second flanged portion to engage a flange of the disk holder, the disk holder to slide relative to the guide when the sensing element moves between the first and second positions.

21. The fluid regulator defined in claim 20, wherein the actuator includes a first housing portion coupled to a second housing portion, each of the first and second housing portions includes an inner surface having a curved cross-sectional shape or profile to increase a contact surface area between the sensing element and the inner surface.

22. The fluid regulator of claim 20, wherein the valve stem has a pathway to fluidly couple the inlet of the valve body and the third chamber.

23. The fluid regulator defined in claim 22, wherein the valve stem comprises a non-hollow body and the pathway extends through only a portion of the non-hollow body of the valve stem to allow fluid flow between the inlet adjacent a first side of the flow control member and the third chamber in direct fluid communication with a second side of the flow control member opposite the first side of the flow control member to pressure-balance the flow control member.

24. The fluid regulator of claim 22, further comprising a port formed in the valve body, the port to fluidly couple the inlet and a fluid source separate from the fluid regulator via the pathway of the valve stem and the third chamber.

25. The fluid regulator of claim 20, further comprising a valve seat having a first portion defining a seating surface composed of an elastomeric material and a second portion composed of a metallic material, the elastomeric material being directed away from a fluid flowing from an inlet of the valve body such that any particulate in the fluid is imparted to the second portion of the valve seat rather than the first portion of the valve seat, the flow control member to move relative to the elastomeric material of the seating surface.

26. A fluid regulator comprising:
means for modulating fluid flow through a passageway of a valve body;
means for actuating the means for modulating the fluid flow, the means for actuating having means for sensing pressure, the means for sensing pressure defining first means for receiving a fluid adjacent a first side of the means for sensing pressure and second means for receiving a fluid adjacent a second side of the means for sensing pressure, the first side being opposite the second side, the means for actuating and the valve body defining third means for receiving a fluid, the third means for receiving being fluidly isolated from the first and second means for receiving, the third means for receiving to at least partially receive a portion of the means for modulating;
means for operatively coupling the means for actuating and the means for modulating, the means for operatively coupling having means for pressure-balancing the means for modulating fluid flow, the means for pressure-balancing to allow fluid from an inlet of the passageway to flow across the means for modulating to the third means for receiving between a first side of the means for modulating and a second side of the means for modulating opposite the first side to pressure-balance the means for modulating;
means for fluidly coupling the fluid from the inlet to a source separate from the fluid regulator via the means for pressure-balancing and the third means for receiving; and
means for guiding positioned within the third means for receiving the fluid, the means for guiding having a first end including a first means for capturing and a second end having a second means for capturing, the first means for capturing being positioned between the means for actuating and the valve body and the second means for capturing to engage a third means for capturing of the means for modulating, the means for modulating to slide relative to the means for guiding when the means for sensing pressure moves between a first position and a second position.

* * * * *